United States Patent [19]
Hull

[11] Patent Number: 4,498,140
[45] Date of Patent: Feb. 5, 1985

[54] AUTOMATED SELF CALIBRATING EXPOSURE COMPUTER

[75] Inventor: Frank A. Hull, St. Paul, Minn.

[73] Assignee: Chesley F. Carlson, Minneapolis, Minn.

[21] Appl. No.: 384,223

[22] Filed: Jun. 2, 1982

[51] Int. Cl.³ .................. G03B 27/72; G01J 1/10
[52] U.S. Cl. .................. 364/571; 364/525; 355/14 E; 355/69; 355/70
[58] Field of Search .................. 364/571, 525, 569; 355/38, 68, 69, 70, 71, 14 E; 356/229, 230

[56] References Cited

U.S. PATENT DOCUMENTS

| | | | |
|---|---|---|---|
| 3,528,740 | 9/1970 | Bowker | 356/202 |
| 3,542,479 | 11/1970 | Sibalis | 356/202 |
| 3,611,159 | 10/1971 | Florsheim, Jr. | 355/69 |
| 3,619,055 | 11/1971 | Archer | 355/69 |
| 3,650,624 | 3/1972 | Yamada | 355/69 |
| 3,672,767 | 6/1972 | Pamlenyi | 355/69 |
| 3,734,621 | 5/1973 | Moody et al. | 356/95 |
| 3,741,664 | 6/1973 | Terin | 356/203 |
| 3,743,821 | 7/1973 | Pamlenyi | 355/69 |
| 3,795,444 | 3/1974 | Glidden et al. | 355/68 |
| 3,828,226 | 8/1974 | Pamlenyi | 355/38 |
| 3,909,137 | 9/1975 | Kisanuki | 354/23 D |
| 3,921,183 | 11/1975 | Toyoda | 354/23 D |
| 3,970,393 | 7/1976 | Krygeris et al. | 356/212 |
| 3,992,098 | 11/1976 | Wirtz | 355/68 |
| 4,072,426 | 2/1978 | Horn | 356/212 |
| 4,080,075 | 3/1978 | Berg | 356/202 |
| 4,103,307 | 7/1978 | Shinoda et al. | 364/525 |
| 4,132,985 | 1/1979 | Kitaura | 354/23 D |
| 4,136,277 | 1/1979 | Gerrard | 355/68 |
| 4,140,391 | 2/1979 | Laciak et al. | 355/38 |
| 4,154,516 | 5/1979 | Wagensonner et al. | 354/23 D |
| 4,172,659 | 10/1979 | Laska | 355/68 |
| 4,194,838 | 3/1980 | Bey et al. | 356/404 |
| 4,227,808 | 10/1980 | Yuasa | 354/23 D |
| 4,273,428 | 6/1981 | Borowski et al. | 354/23 D |
| 4,361,395 | 11/1982 | Washio et al. | 355/69 |
| 4,394,087 | 7/1983 | Irie et al. | 355/14 E |

FOREIGN PATENT DOCUMENTS

| | | | |
|---|---|---|---|
| 55-87130 | 1/1980 | Japan | 364/525 |
| 55-130534 | 9/1980 | Japan | 355/68 |

OTHER PUBLICATIONS

Teledyne Philbrick, Information Sheet on Models 4357/4358, Mar. 1972.

*Primary Examiner*—Jerry Smith
*Assistant Examiner*—Karl Huang
*Attorney, Agent, or Firm*—Dorsey & Whitney

[57] ABSTRACT

The invention disclosed, a microprocessor based exposure computer, automates the time consuming and tedious calibrations and calculations which were necessary to reproduce high quality copy in the field of graphic arts. The automated nature of the invention includes the ability of the device disclosed to perform a self calibrating function which greatly reduces the set-up time of the instrument which in the past has required trial and error calibrations involving the repeated manipulation of a gray scale of varying density or other variable light attenuator.

38 Claims, 7 Drawing Figures

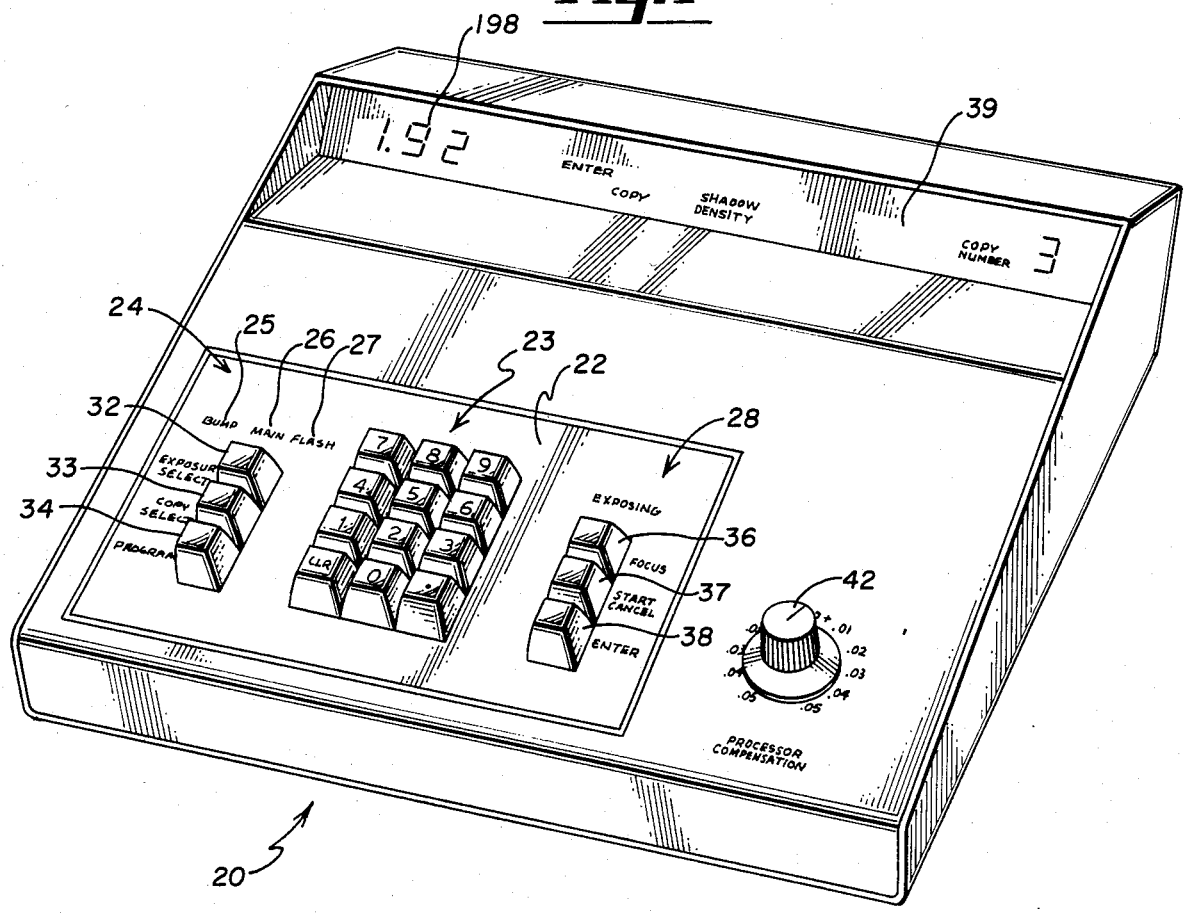
Fig. 1
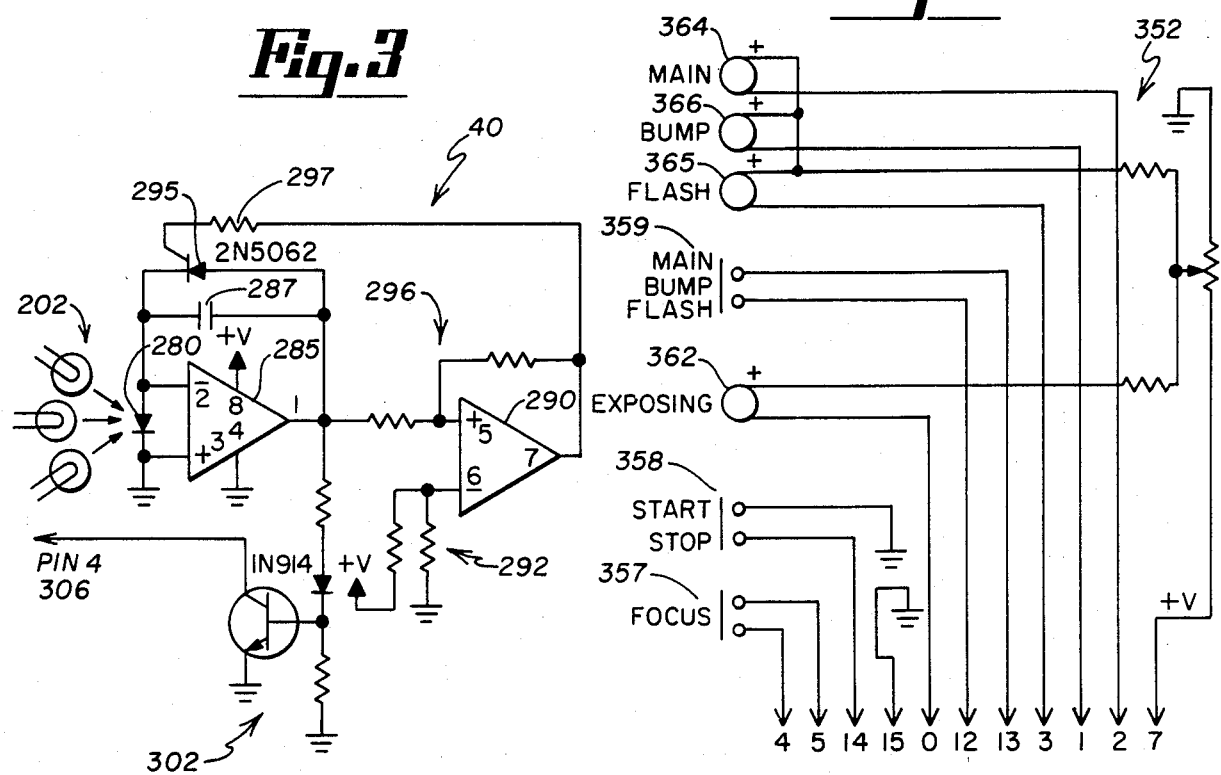
Fig. 3
Fig. 5

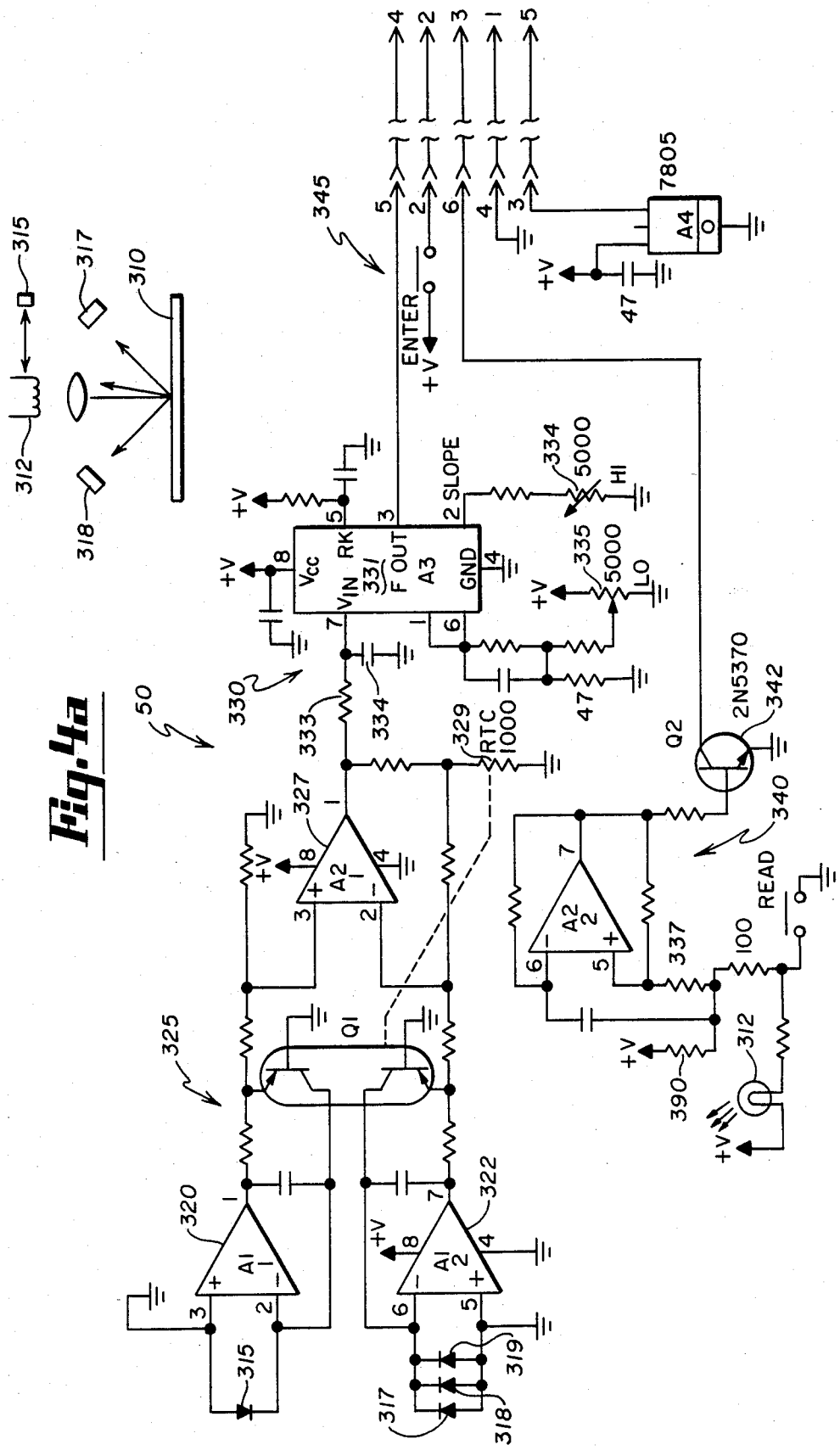

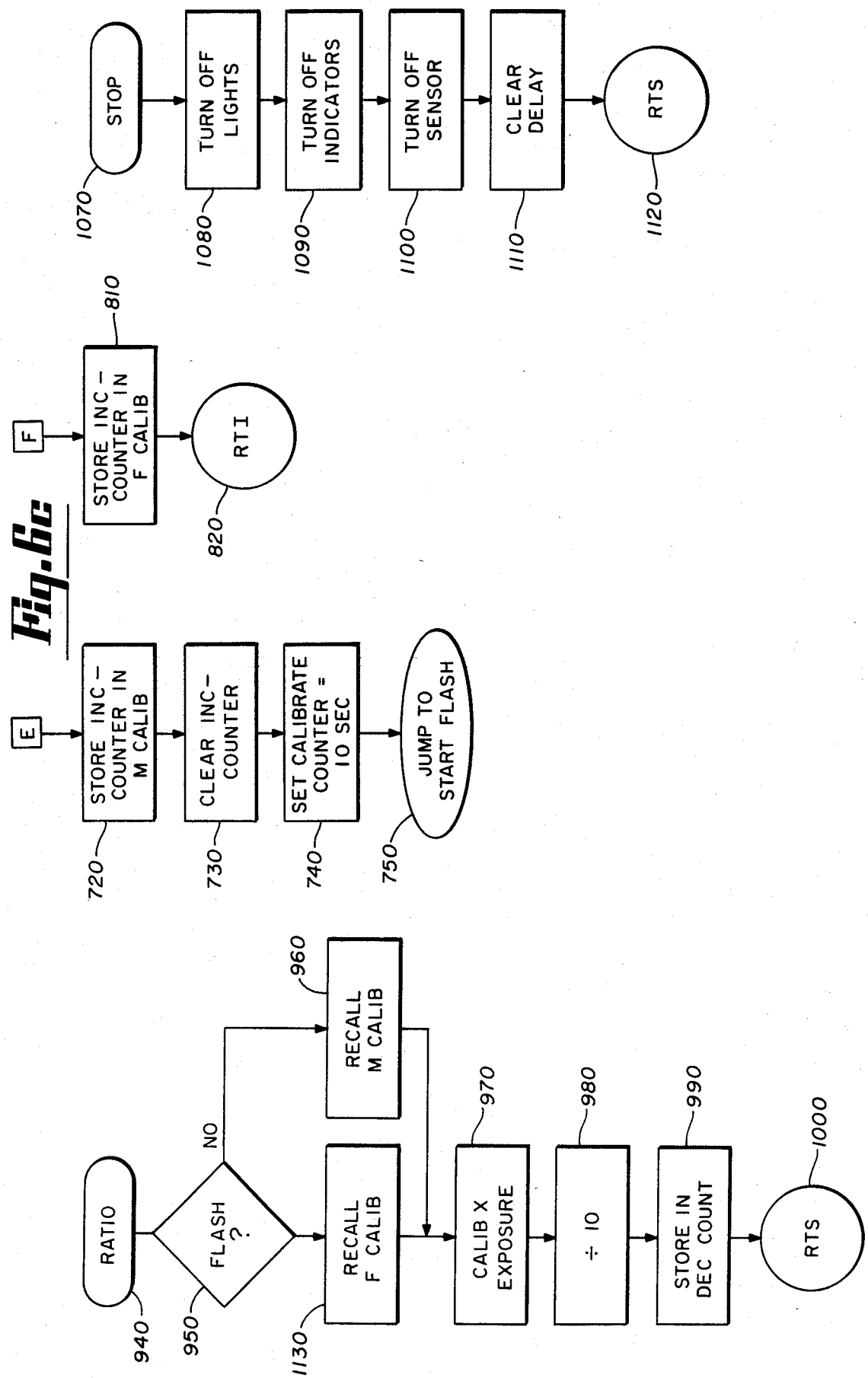

AUTOMATED SELF CALIBRATING EXPOSURE COMPUTER

MICROFICHE APPENDIX

A microfiche appendix comprising one microfiche jacket and having twenty total frames forms a part of this Specification by reference hereto.

BACKGROUND OF THE INVENTION

The invention is a control device for controlling the exposure of film to the various lights or lamps conventionally used in continuous tone and halftone photographic processes.

Because of the complexity of such processing, based in part on the nonlinear nature of light and film sensitivities, prior art practitioners have resorted to complex electromechanical circuits and devices involving the use of many resistors and capacitors, gears, switches, cams and the like to generate logarithmic relationships; have been limited in the type of information that could be used in or entered into such an exposure computer; and have been faced with a trial and error calibration of the instrument involving the use of a gray scale over the detecting elements so that an initial relationship could be established between a "time unit" value dialed into such an instrument and the amount of real time seconds each of the various types of lamps were energized.

Thereafter the operator has been required to enter either time unit values or density values and did not have the flexibility to vary such parameters from job to job.

Some of the reasons for the complexity in halftone reproduction and processing are as follows.

A proper exposure is dependent on both the exposure time (the time the lamps are energized, variable in time units of seconds) and the relative illumination of the lamps (the intensity of the light, variable in logarithmic units of density).

Five parameters have been generally required, the shadow density of the copy, the highlight density of the copy, the screen range of the halftone screen utilized, the density range of the copy, and the excess density. Excess density is the difference between the copy density range and the halftone screen range. The copy density range is the difference, as measured on the original material to be used, between the main dot size (highlight density) and the shadow dot size (shadow density).

The main exposure is normally based on the dot size desired for the highlight density. The flash exposure, which is based on the excess density, gives the shadow dot size. Placement of a fifty percent halftone dot is controlled with the use of a technique referred to as a "bump" exposure (or a "no-screen bump" exposure) and when a bump exposure is used to vary the halftone dot, the main exposure time must be reduced.

Calibration of such an instrument also depends on the film type, chemistry, and halftone screen being used, as well as the personal preference of the operator as to the dot sizes preferred. Also, timing cycles may vary due to density shifts from variation of chemical activity levels, the emulsion speed of the film being used, or temperature shifts in the chemicals.

While microelectronics has been used in hand held camers where a limited number of variables exist, shutter speed, film speed, and light, either background light or flash exposures, prior art systems in the graphic arts field, because of the complexity of the parameters involved, have not extended microelectronics into the field of continuous tone and halftone processing in the graphic arts.

SUMMARY OF THE INVENTION

The automated self calibrating exposure computer of the instant invention overcomes the complexities and difficulties of the prior art apparatus and provides an instrument which is easily operated by experienced cameramen as well as those initially learning graphic arts. The self calibrating nature of the invention eliminates the trial and error technique with a shifting gray scale used with prior art instruments.

Self calibration in the instant invention includes the creation of a serial pulse train which is transmitted for a preselected period of time used for calibration. The pulses received, which relate both to the time in seconds that the lights are energized and the illumination of the lights, is neither converted into binary coded decimal values, nor time unit values, nor density values. Instead, the absolute value, the number of pulses emitted, are counted and stored as the calibrating count for the instrument.

Since approximately two thousand pulses per second are emitted during a ten second calibration time, extraneous noise pulses have virtually no effect on the accuracy of the instrument and timing of exposures is extremely precise.

All further calculations, which are automatically performed by the instrument, use the calibration count as the basis for calibration of the instrument. The invention calculates and stores the number of pulses that must be received from the selected lamp for a proper exposure and then decrements that count until the lamps have been energized for the proper amount of timed light exposure.

In this manner any variation in the illumination of the lamp caused by aging, dirt, power variations or the like, affects the pulses emitted through the sensor circuitry and are automatically compensated for by the instrument.

Any appropriate units, such as desired densities or exposure times, can be entered by the operator into the exposure computer of the instant invention, converted into an exposure time and run, without hand calculations or any other "tricks of the trade" being required for the highest quality copy.

The many other features, advantages and objectives of the invention will be realized by those skilled in the art upon a review of the accompanying drawings, the description of the preferred embodiment and the appended claims.

DESCRIPTION OF THE DRAWINGS

FIG. 1 is a pictorial perspective of the invention showing the operator controls and the indicating and display means which display values of information being entered, recorded or performed, as well as the particular procedure taking place;

FIG. 3 is a schematic diagram of a remote sensor positioned on the copyboard to measure the main lamps or lights;

FIG. 4, comprising FIGS. 4a and 4b, shows a densitometer input for measuring copy. FIG. 4a is a circuit diagram of the reflection densitometer which can be used to automatically read copy density values into the circuitry of FIG. 1; FIG. 4b shows how the densitometer photodiodes are arranged to receive direct light and reflected light off the copy.

FIG. 5 is a remote control which can be used to control operation of the invention while in a dark room.

DESCRIPTION OF THE PREFERRED EMBODIMENT

Figure 2:
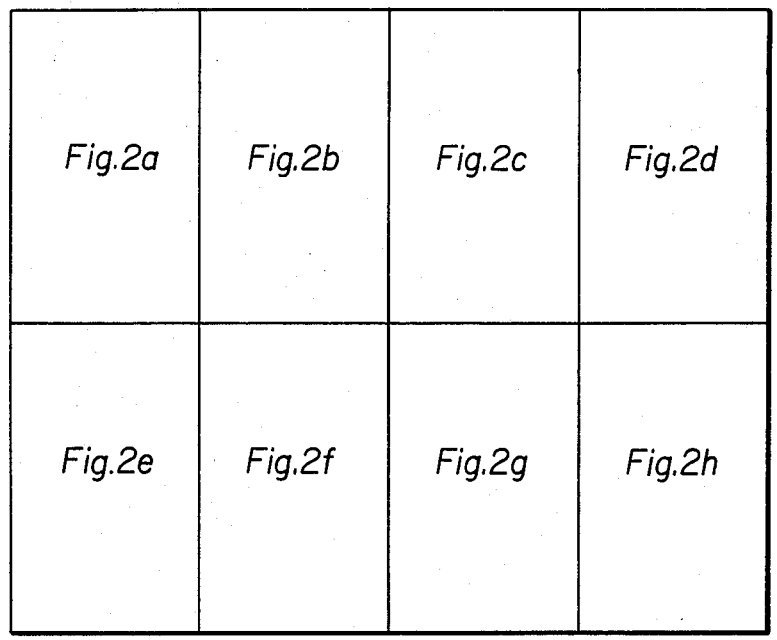
FIG. 2 is a schematic diagram of the electronics of the invention, internal to the apparatus of FIG. 1.

FIG. 1 shows the instrument 20 as it appears to the operator. In addition to the processing and control unit shown in FIG. 1 a remote sensor 40 is used, the schematic for which is shown in FIG. 3, which measures the light striking the copyboard, both its time duration and intensity, as will be explained in more detail below. In addition, a densitometer input 50 can be connected to the back of the control unit. The densitometer 50 schematic is shown in FIG. 4 and can be used to enter directly the shadow density and highlight density of the particular piece of art work that is to be reproduced for printing. Connections for control can also be made to the camera (not shown) to control the shutter and a filter (not shown) used for bump exposures.

As shown in FIG. 1 there is an input keyboard 22 which can be used to enter all input data required. Also as shown in FIG. 1 an exposure sequence 24, identifying bump, main and flash exposures, includes small illuminated LEDs and associated labels 25, 26 and 27, to display to the operator which calibration or exposure is being made. Function keys 32–34 labeled "Exposure Select", "Copy Select" and "Program" allow the operator to select the following functions. The "Exposure Select" key 32 permits the operator to select any given lights. The "Copy Select" key 33 enables the operator to correlate halftone data with correct copy during multiple programming of halftone exposures. The "Program" key 34 is used in making the initial entries for basic programming and designing the halftone structure desired.

On the right of the numerical input keys three additional function keys 36–38 are included, a "Focus" key 36 to bring camera lights into continuous lighting so that the material to be reproduced can be focused on the copyboard, a "Start/Cancel" key 37 which is pressed once for starting an exposure and a second time to cancel, and an "Enter" key 38. When the "Enter" key 38 is depressed the keyboard information is entered into the the microcomputer. For example, shadow and highlight densities can be entered and the microcomputer will calculate the correct exposure times to reproduce these densities in the copy. This is the most used function key and is placed in the indicated location for maximum ease of use.

An override control 42 is provided labeled "Processor Compensation" which is connected to the microprocessor 160 to modify time programs to compensate for changes in film processor chemistry or changes in emulsion speed of films or the like.

Referring now to FIG. 2, the internal components of the control unit 20 are shown which includes a processing means 100 for receiving input data and for supplying control signals to display the process or procedure being performed and to actually perform the various exposures discussed above. The processing means 100 is a programmable digital processing means for storing the input data and the control information includes a stored program for directing control functions to be performed and for supplying control signals as a function of the control information. The processing means 100 include a Motorola microprocessor 110, manufacturer's designation 6802, a program memory 120, preferably an EPROM, manufacturer's designation 2532, and two data memories 130, 131, which are preferably CMOS RAM's, manufacturer's designation 5101.

Two input/output ports 140, 141 are provided both of which are also manufactured by Motorola, manufacturer's designation 6821. One input/output port 141 is used to control the display of data, to control the function display and to control the main lamps, camera shutter, flash lamp and bump filter.

These microcomputer elements 110, 120, 130, 131, 140, 141 are interconnected in a conventional manner using a data bus 150, address bus 151, and a control bus 152. Power to the memories 130, 131 is preferably provided off a regulated power supply 155 and has a battery back-up protection circuit 157 connected with line 156 to the unregulated power supply 160 that supplies the regulated power which takes the memory chips 130, 131 off of the regulated power supply 155 during power-up and power-down or if other problems occur in the unregulated power.

As can be seen from drawings, two circuit functions occur. In the event of loss of power, data written on the chips 130, 131 is protected and power is supplied to the chips 130, 131 from a battery 159. The regulated and unregulated power is supplied to comparator 741 on input pins 2 and 3 respectively. If unregulated power is lost the output of comparator 741 on pin 6 goes negative. It is connected to the CE2 input of chips 130 and 131 to prevent data from being written to the chips. This prevents loss of data. During power up and power down or if power is lost, power is supplied by standby battery 159. The Vcc input of the chips 130, 131 is normally supplied from the regulated power supply 155 through diode 163. If the regulated power supply falls below a predetermined value diode 163 opens, and power to the Vcc input of chips 130 and 131 is supplied from battery 159. Similarly, during power up the diode 163 is open and the CE2 input is disabled by comparator 741 until the regulated power supply 155 has stabilized, thus constituting a time delay to avoid loss of data. During normal operation the battery 159 is charged by the regulated power supply 155 through the diode 163.

A chip select circuit 170 is also used connected to the address bus 151 which accesses the appropriate memory chip 120, 130, 131 depending on the command or data required by the microprocessor 110.

An internal clock frequency of one megahertz is provided with a crystal oscillator 180. This clock frequency is divided by sixteen with a solid state counter 181, manufacturer's designation 4040, to provide timer interrupts every 4.1 milliseconds. Operator input data is entered on the twelve key keyboard 23 including decimal point and clear key. Functional commands to the device can be entered on the six additional keys 32–34, 36–38 shown, which are physically located on each side of the keyboard but which fall within the three by six matrix 182 connected to the key matrix input port 140.

Operator activity with the keys is detected with the use of the key matrix 182, connected to the input port 140 decoder and, as will be explained in more detail in connection with the functional flow diagram, the depression of any key causes an interrupt to the microprocessor 180 for purposes of receiving and storing input data or performing a requested function. The microprocessor 110 continuously scans the key matrix 182 and if a low is detected, signifying key depression, a driver signal is connected sequentially to each column. The next scan then determines which key has been depressed and an appropriate interrupt is processed.

Data is displayed with the use of one byte of the output port 141 using a display driver 190, manufacturer's designation CA 3161 and multiplexer 192, manufacturer's designation 74S139, which cycles at the 4.1 millisecond clock rate. The processor 110, 141 puts out BCD code and the display driver 190 converts it into the seven segment code used to run the alphanumeric displays 198. The numerical LEDs 198, as well as decimal points, are sequentially energized at the 4.1 millisecond rate which, because of eye retention, does not cause flicker but appears as if all are simultaneously energized.

Depending on the function being performed a series of LEDs 200 is energized through a driver 230, manufacturer's designation 74154, by a four line BCD input controlled by the microprocessor 110 through port 141, each of which lights one or more words or symbols 240 on the display panel 39 so that the operator using the device can read the function being performed.

To initially program an exposure, depression of the program button 34 sequences through the indicated legends 240. The operator may "Enter" exposure times, densities, percent Flash, percent Bump, and the like. Entered values are used by the microprocessor 110 to calculate exposure times, as explained below. Entered values, for example "percent Bump", will override calculated values.

As shown in FIG. 1 the operator is entering the shadow density of the copy which has a shadow density of 1.92. This is the shadow density of the third piece of copy to be processed that is being stored in the microcomputer 100 data memory.

The output port 141, on appropriate command from the microprocessor 110, also energizes for the period of time and in the manner discussed in connection with the flow chart below, the camera shutter (not shown), the main exposure lamps 202, the flash lamp (not shown), bump filter (not shown) if a no screen bump exposure is to be performed. These signals are connected through an amplifying buffer 210, manufacturer's designation ULN 2004, to four relays (214-217), each of which has relay contacts 219-222 which when closed supply power to the respective devices. A resistor 230 and capacitor 231 is associated with each relay contact 219-222 for damping.

The input port 140 is also connected to a driver decoder 250, manufacturer's designation 74S139, to illuminate the three LEDs 25, 26, 27, on the keyboard 22 which indicate which exposure is being calibrated or performed. The Expose LED 28 is energized from the buffer amplifier 210 that drives the lamp relays 214-217.

The autocalibrate and light detecting circuitry 40, 41, which greatly enhances the ease of operation and functioning of the device, consists of the main lamp sensor circuit 40 shown in FIG. 3, preferably mounted remotely from the device on the copyboard (not shown), and the flash sensor circuit 41 shown in FIG. 2 which is used to calibrate and to time flash exposures. Since the flash exposure is accomplished with a tungsten filament lamp a small tungsten filament lamp 252 can be mounted internal to the housing for purposes of calibration and time light measurements.

Power to the sensor circuits 40, 41 is supplied, as shown in FIG. 2 with a two transistor switching circuit 260 which, through the use of a zener diode 262 connected to the flash LED 27 line, supplies the twelve volt power to the flash sensor circuit 41 or to the main lamps sensor circuit 40 but connected to output pins 3 and 1 of the output board J2.

When either the main 202 or flash lamps are energized an associated photodiode 280, 281 is positioned to sense or detect when the lights are energized. Each photodiode 280, 281 is connected to identically configured pulse generation circuits shown in FIGS. 2 and 3.

The calibration count, and subsequent time-light exposure counts, is obtained from the photodiodes 280, 281 when the lamps are energized. The photodiode 280, 281 is hooked across the input pins 2, 3 of an opamp 285 across which is a charging capacitor 287. Also connected to the output of the opamp 285 is a second operational amplifier 290 used to control an associated SCR 295 which discharges the capacitor 287. Connected to input pin 6 of the second opamp 290 is a voltage divider 292 establishing a reference voltage of approximately four volts on input pin 6. Consequently, when the voltage across the capacitor 287 rises to four volts the output, from pin 7 of the second opamp 290, will go high. This output is fed through a current limiting resistor 297 to the SCR 295 across the capacitor 295. When the SCR 295 fires the voltage in the capacitor 287 will be discharged. Connected to input pin 5 of the second opamp 290 is a balanced divider 296 to establish the hysteresis of the opamp 290.

The output of the Schmitt trigger circuit, the sawtooth waveform, is connected to a one transistor amplifier pulse shaper 302 which clips the pulses to provide the serial digital pulse train. This converts the sawtooth waveform into a square wave. The output of the pulse shaper is connected to the input, pin 4, of a flip-flop which cleans up the pulses. The output of the one-shot 306 is a well defined pulse train which is connected as an interrupt to one 141 of the input/output ports 140, 141 of the microcomputer at interrupt port CB1. The one-shot 306 also functions to limit the pulse train frequency rate so that the pulse train does not exceed a maximum interrupt rate for the circuit.

The pulses from the sensor circuits 40, 41, whether during the ten second calibration time or during the measurement of exposure times during processing, are a direct measurement of the time-light exposure. That is, they relate directly both to the actual time in seconds that the lights are energized as well as the intensity of the illumination. Therefore, if the lights are less bright during an exposure than they were during the calibration, it takes longer to charge the capacitor 287 and thus the number of pulses or counts per unit time become less, thereby assuring that the correct amount of light strikes the copy. Also, because the number of pulses per unit of time is easily perceived by the microcomputer, reciprocity error, which is a function of the exposure time and the intensity of the illumination, can be easily detected and compensated for with an appropriate subroutine.

Figure 2A:
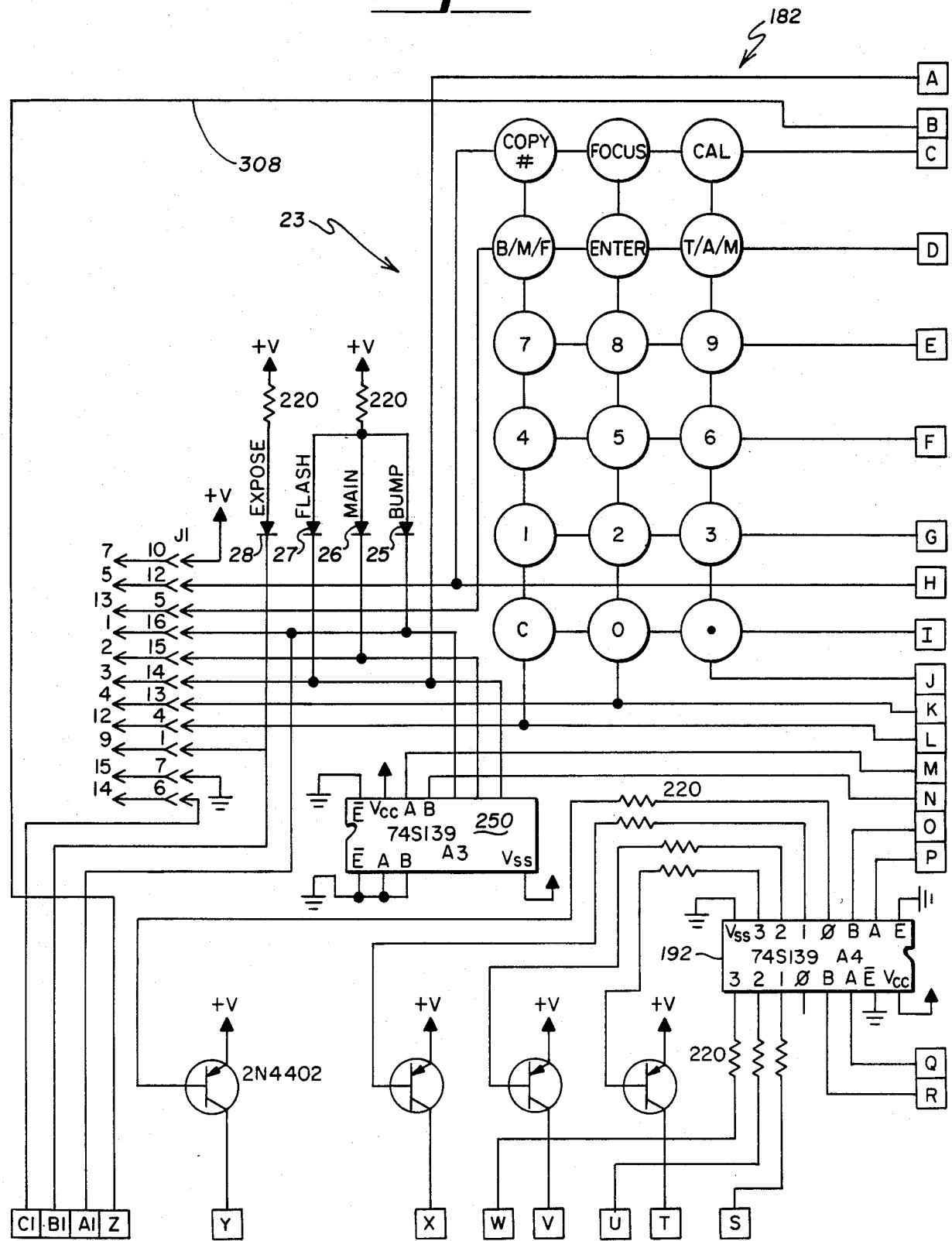
Figure 2B:
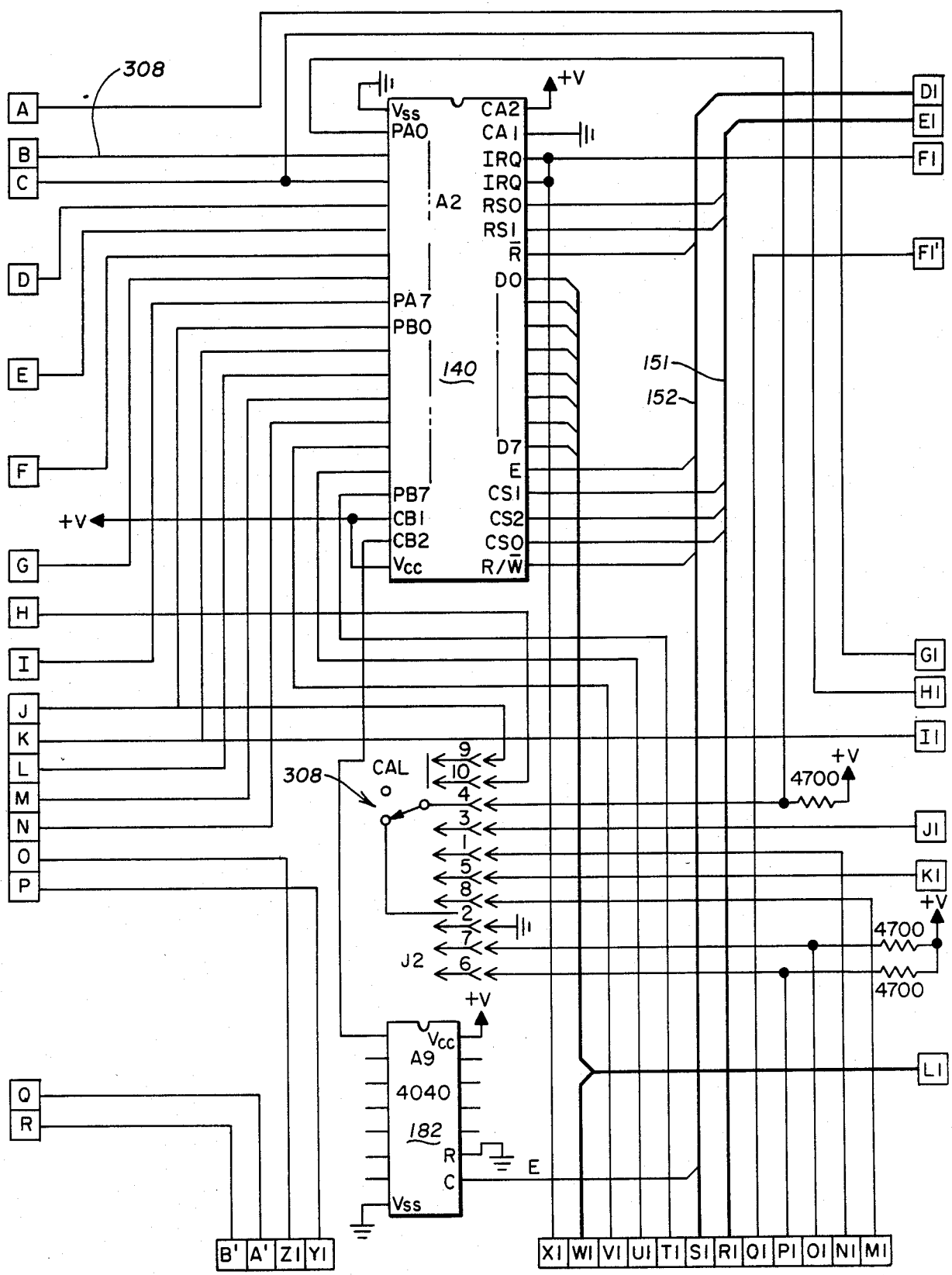
Figure 2C:
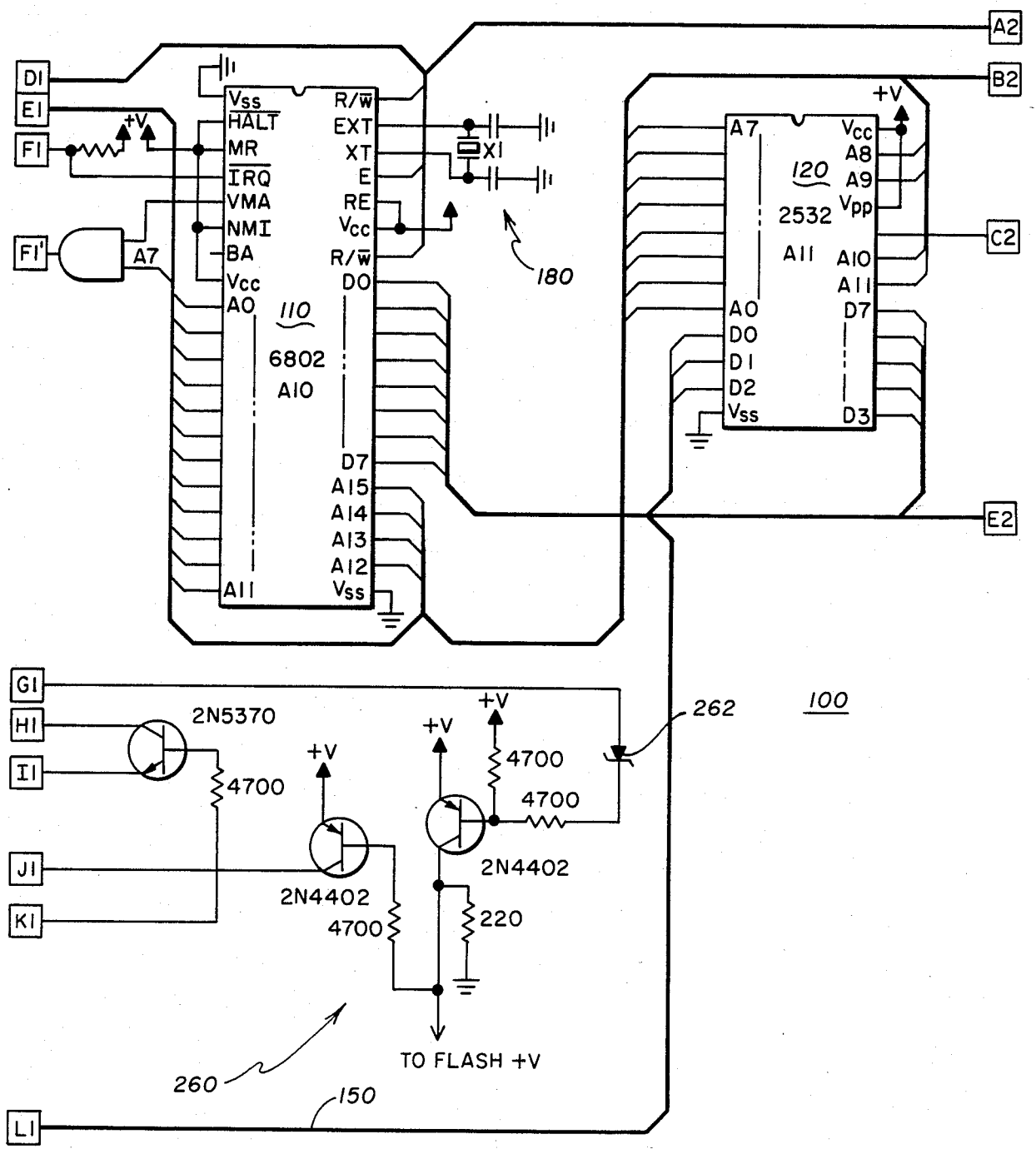
Figure 2D:
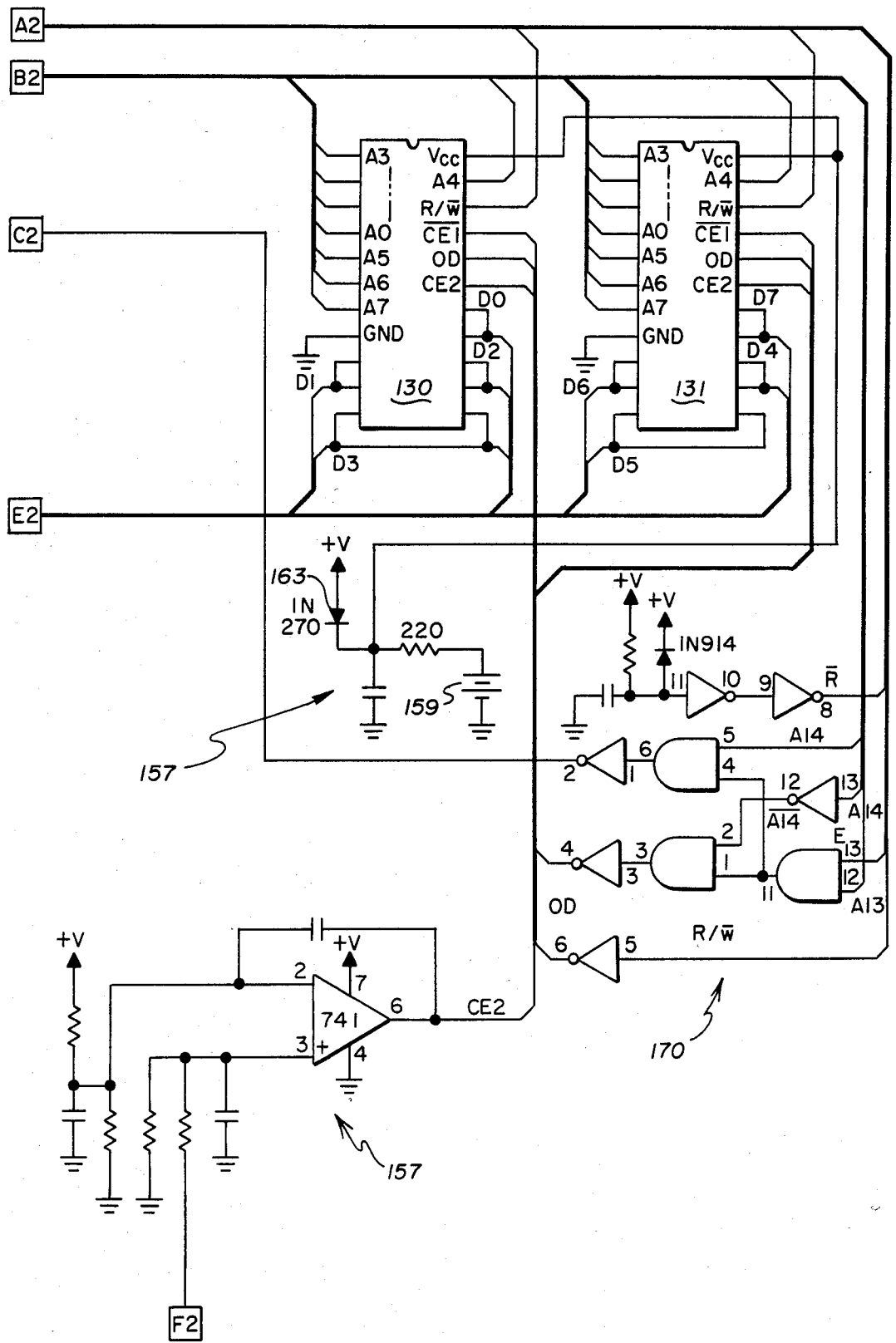
Figure 2E:
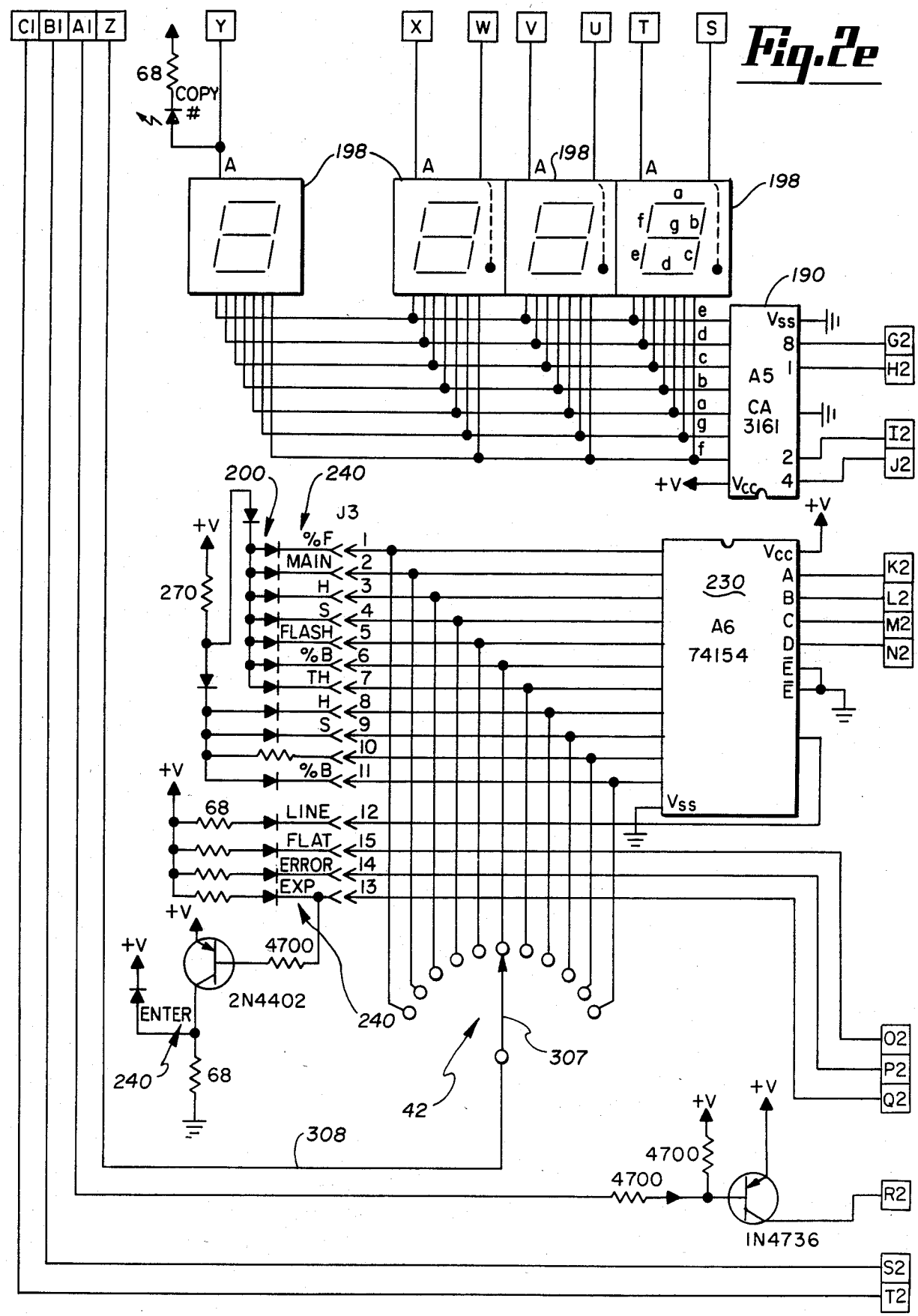
Figure 2F:
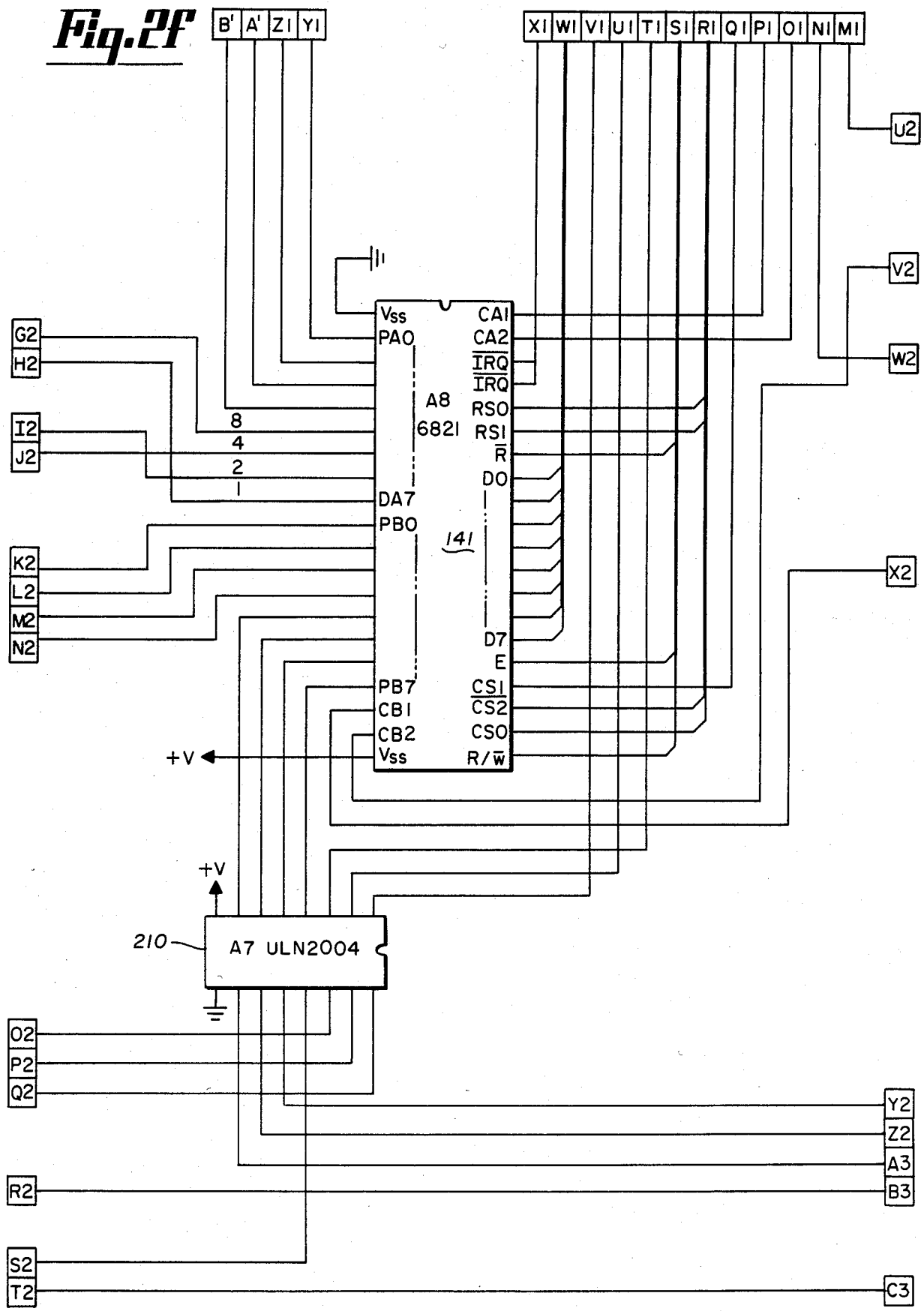
Figure 2Q:
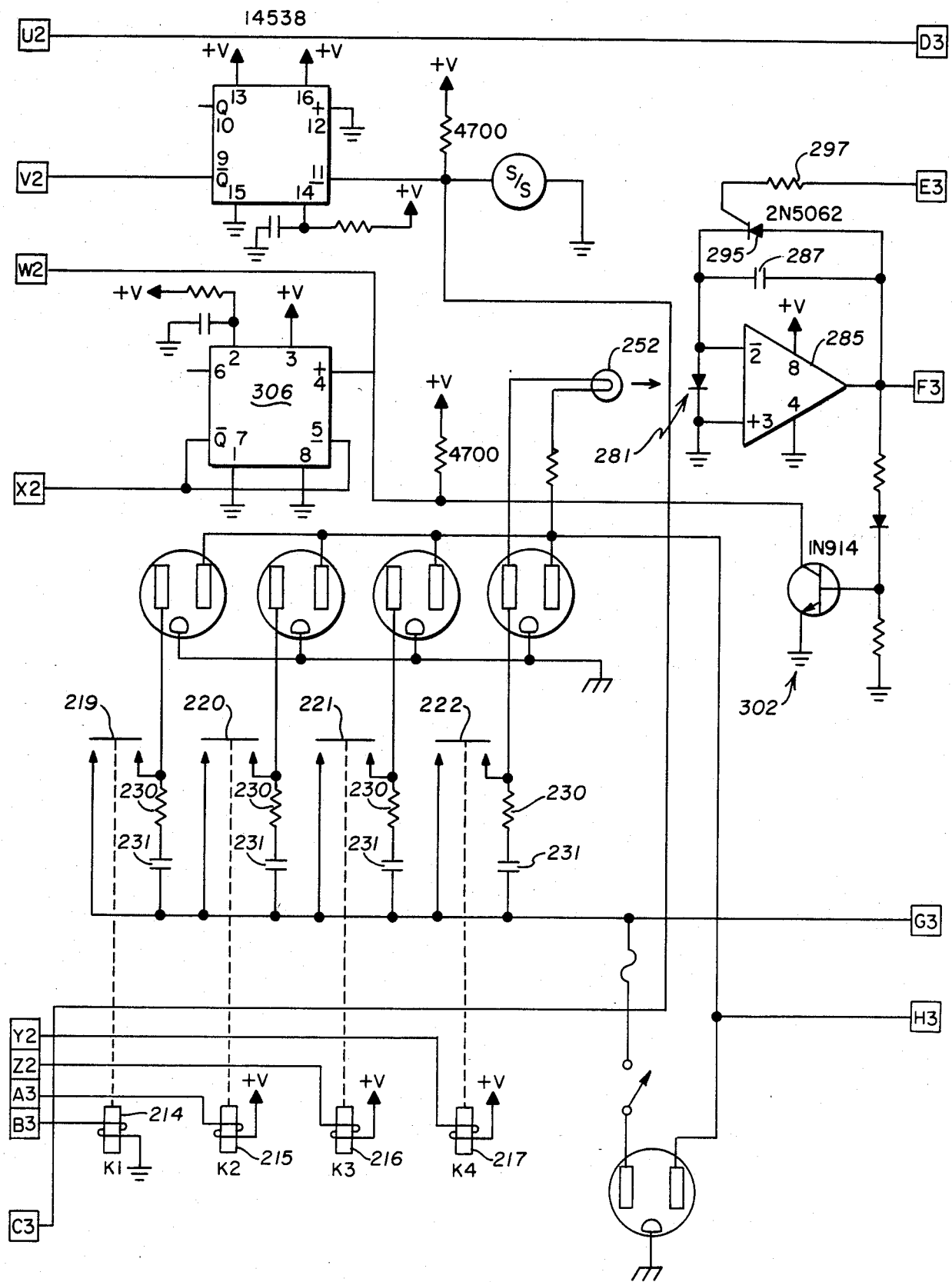
Figure 2H:
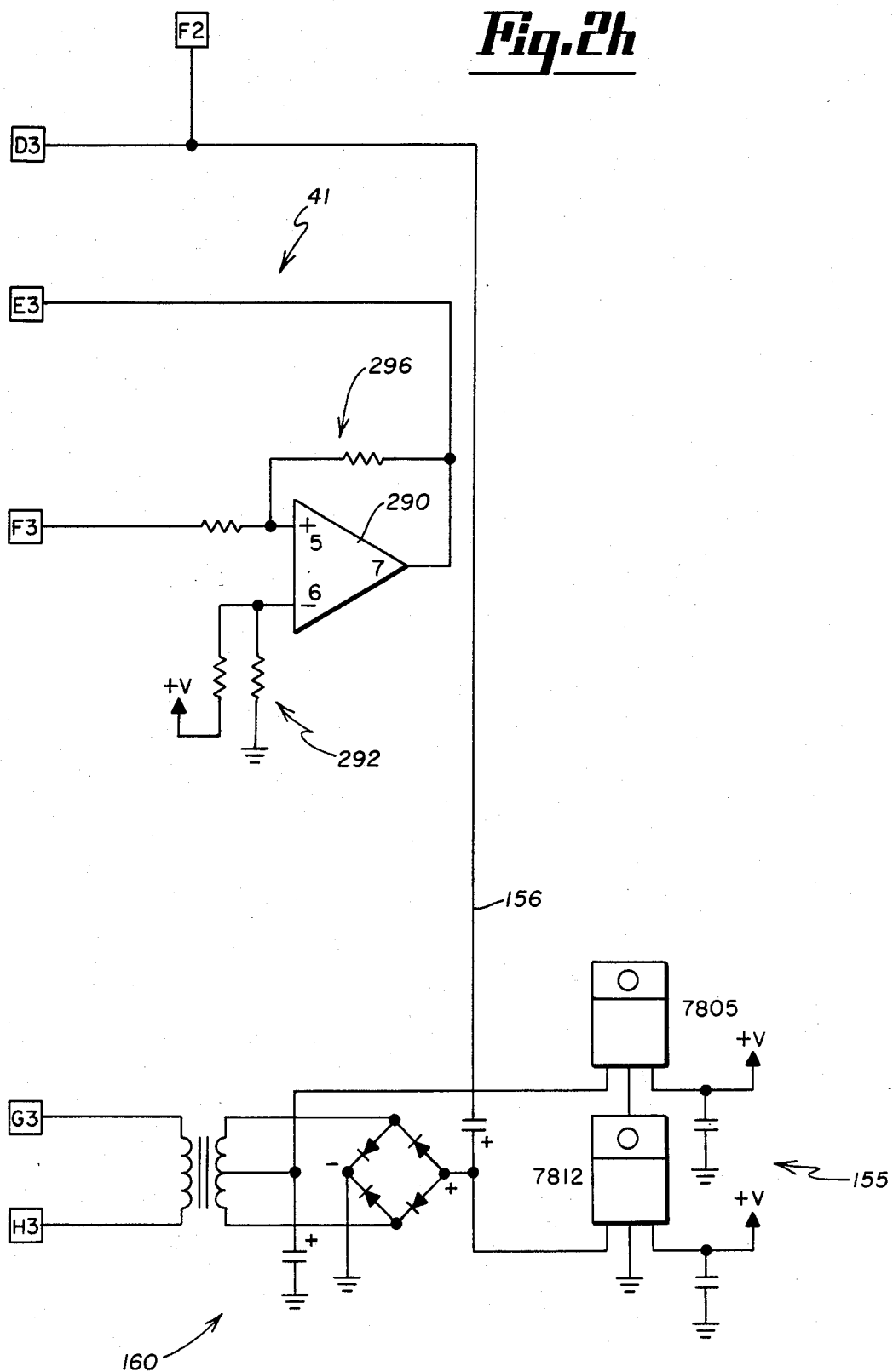
Figure 6A:
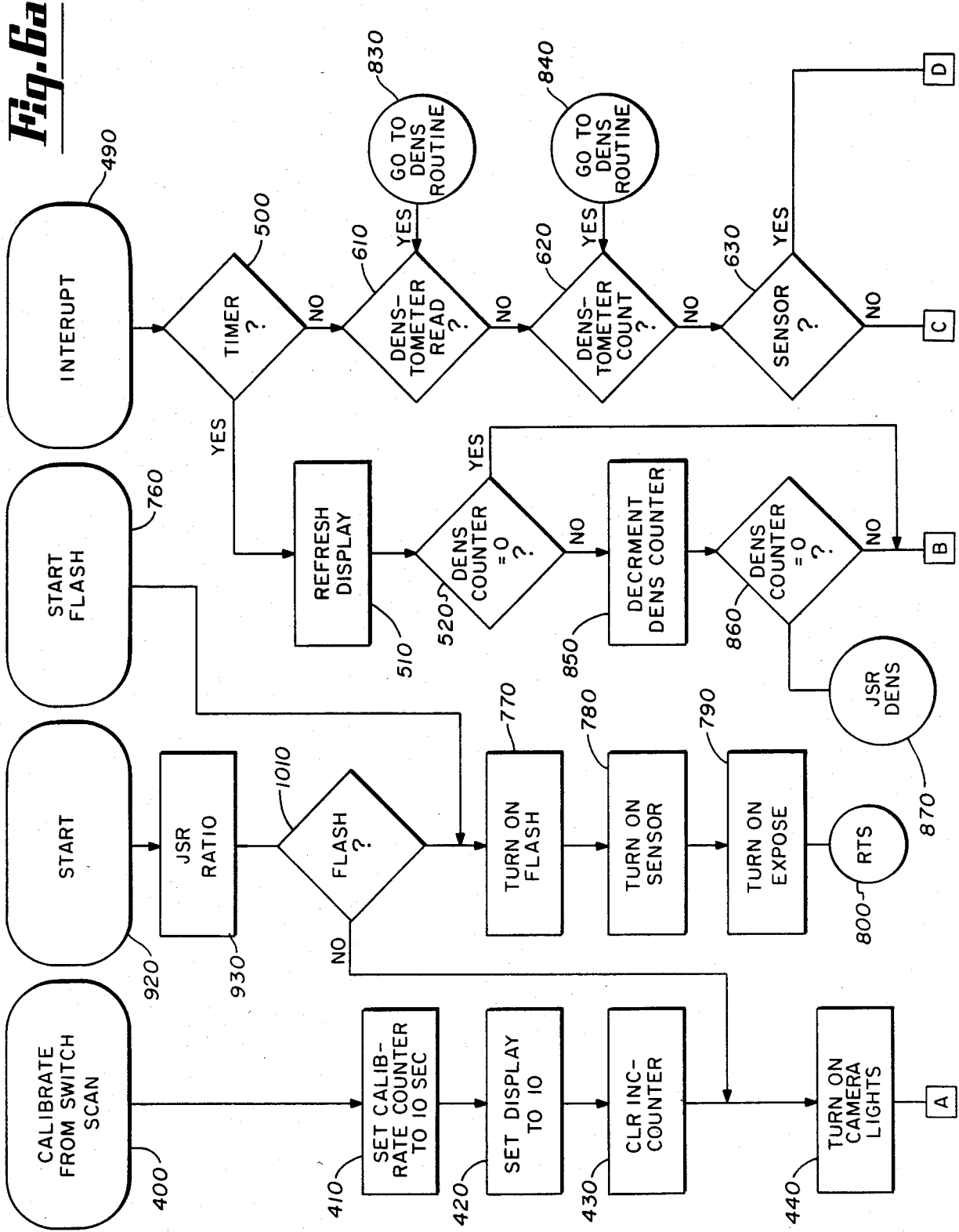
Figure 6B:
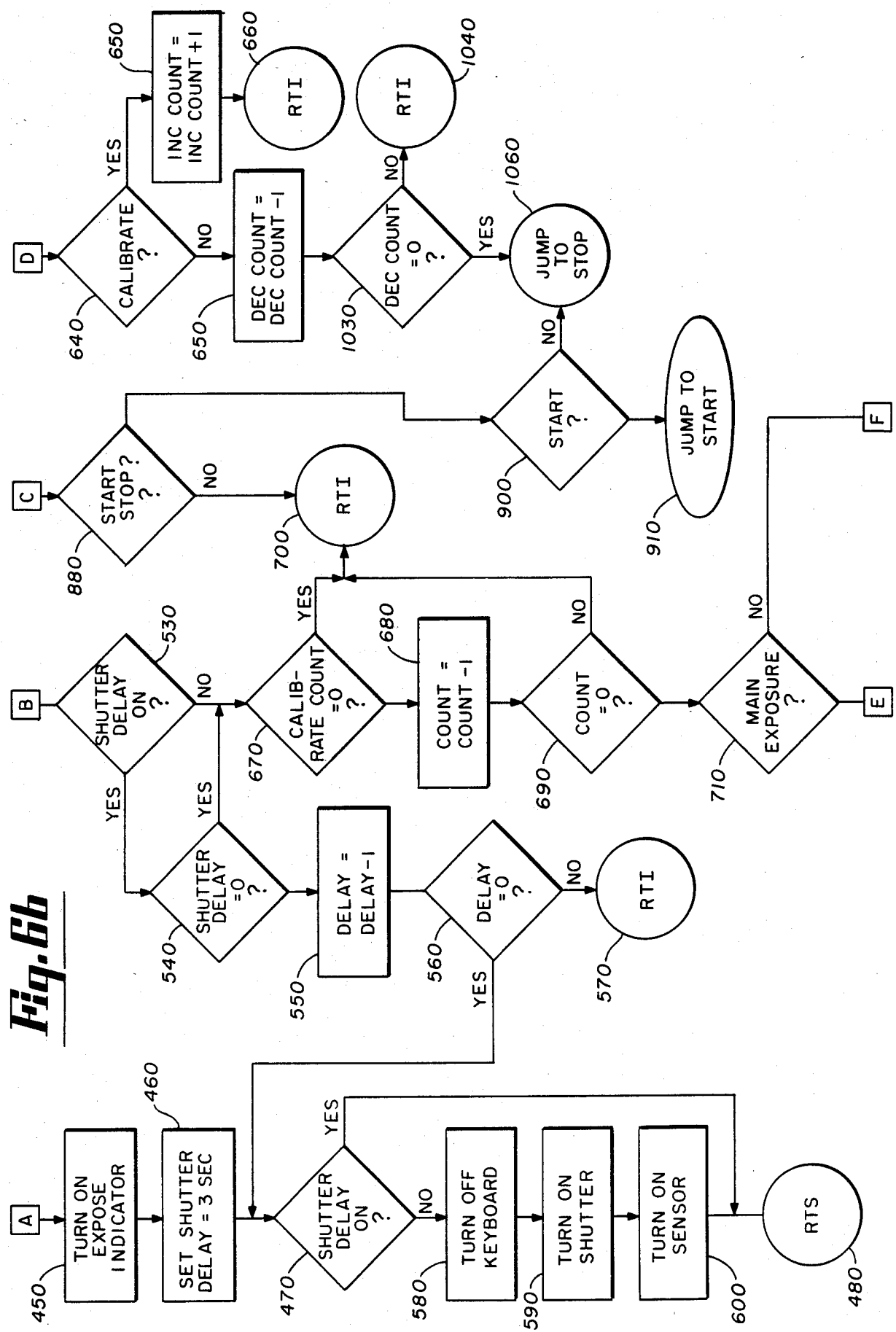

The processor compensation control 42, shown on FIG. 1, used for override control, is also shown on the lower half of FIG. 2e. The selector arm 307 of the multi position switch 42, as shown in the drawings, is connected along line 308 to the input port 140 to the microprocessor 110. Consequently, when the "START" button 37 is depressed the microprocessor 110 polls the output driver 230 through output port 141 and the position of the switch 42 is connected to the input port 140, indicating to the microprocessor 110 the necessary correction or modification. As known to those skilled in the art, the compensation is added or subtracted to or from one, as appropriate, and the resulting value is multiplied by the exposure time. For example, for a minus 0.04 correction an exposure time of ten seconds would be multiplied by 0.96 to obtain a correct and compensated exposure.

FIG. 4, consisting of FIGS. 4a and 4b, show an automated densitometer 50 input to the device.

As shown schematically in FIG. 4b illumination of the copy 310 to be reproduced is provided by an incandescent bulb 312. A first photodiode 315 is positioned to detect directly the intensity of the lamp 312. Three additional photodiodes 317-319 are positioned at angles of one hundred twenty degrees around the read head (not shown) to pick up the reflected light in order to determine the density of the copy 310. Although any conventional densitometer head can be utilized, it is preferred that the "dipping bird" design be utilized. The diodes 315, 317-319 utilized are preferably from the blue enhance series manufactured by Vac-Tech.

The current through the reference diode 315 is connected to a first opamp 320 to convert the current to voltage. The currents through the reflection diodes 317-319 are connected to a matched opamp 322 for the same purpose. The opamp 320, 322 outputs are connected to a log amplifier 325 including a dual or matched PNP pair of transistors, manufacturer's designation AD820.

The output of the log amplifier 325 is connected to an operational amplifier 327 configured in the standard differential amplifier configuration to operate as a summing amplifier. The photodiode 315 detecting raw lamp light is used as the reference and varies the response for variation in the light emitted. The reflection photodiodes 317-319 are connected to the negative input of the summing amplifier 327. Therefore, when the light is being reflected off lighter areas of the copy 310 the intensity of light received by the reflection photodiodes 317-319 will go up and the output of the summing amplifier 327 goes down. Similarly, if darker copy 310 is being checked, the output of the summing amplifier 327 will increase.

Temperature compensation, to compensate for temperature drift of the circuit 50, is provided by a thermister 329 mechanically linked to the logging amplifier 325. The output of the summing amplifier is connected to a filter 330 consisting of a resistor 333 and capacitance 334 to eliminate any ripple that may be picked up in the signal. The output of the filter 330 is supplied as the input to a precision voltage to frequency converter 331, manufacturer's designation LM 331. The output of the converter 331 is a pulse train at a frequency proportional to the applied input voltage. This pulse train, having an absolute value of pulses per second which correlates directly to the sensed density, is fed to the microcomputer 100 through board J2 as an interrupt CA2 to port 141 as a serial pulse train to be counted. It is extremely insensitive to noise pick up and the like and provides more accurate data than conventional low current analog devices. It also has clear advantages over BCD digital transmission which requires up to seven leads to transmit the BCD code.

High and low adjustable resistors 334, 335 are supplied, the high resistor 334 operating as a gain control to establish the slope of the output. This can be used for initial calibration of the densitometer 50 read head.

Connected as a second output from the densitometer is the "read" control 337. Depression of the "read" push button 337 on the densitometer 50 head turns on the lamp 312 and starts an oscillator 340. The oscillator 340 output is amplified with a single transistor amplifier 342 and connected to the output port 141 through board J2 as an interrupt CA1 input to the microprocessor 110. The oscillator output serves as the interrupt to tell the microprocessor 110 that a densitometer 50 reading is taking place.

A third input to the microprocessor from the read head is a push button labeled "enter" 345 which serves the same function as the enter function key 38 on the control unit 20. Once the operator has located the density that he wants to transmit to the microprocessor 110, he simply presses the "enter" key 345 on the densitometer 50 and enters it into the microprocessor 110 data memory 130 or 131. In this manner the densitometer 50 becomes a very high speed tool with which an operator can enter the highlight and shadow densities of approximately ten copies in a matter of a minute or two.

After initial calibration of the instrument 50 the densitometer pulses can be read and the densitometer auto-calibrated in the same manner as the exposure lamps by timing the pulse count for three tenths of a second calibration and reading time.

The preferred procedure, however, in view of the varied types of copy 310 which might be used, would be to take an initial calibration on standard highlight and shadow densities and adjust the high-low controls 334, 335 to be sure of highly accurate densitometer 50 readings with an accuracy comparable to the extremely high accuracy of the control unit 20.

The use of blue enhanced photodiodes 317-319 provides another distinct advantage to the operator of the invention since this feature yields an ortho response giving accurate densities for color separations.

Shown in FIG. 5 is a remote control unit 352 which may be attached to input board J1. This remote control 352 can be advantageously used in a dark room environment. As clearly indicated in FIG. 5, three function keys 357-359 are provided: "Focus" 357, "Start/Stop" 358, and "Main Bump Flash" 359. The remote control unit 352 also picks up and displays the LED 25-28 indications confirming that the control unit 20 is exposing 362 using either the main lamps 364, flash lamps 365, or the main lamps for a bump exposure 366.

Figure 6:
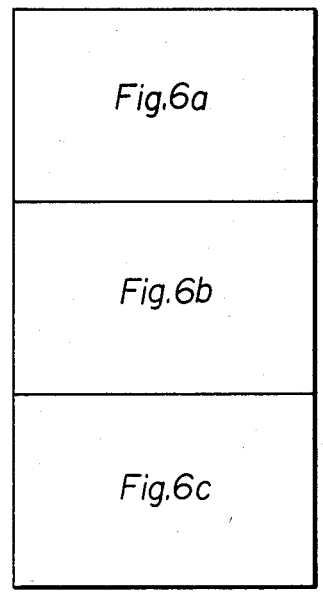
FIG. 6 is a functional flow chart of the software used in the microcomputer to store the necessary calibration information and to provide the control signals necessary to automatically and sequentially control the production of high quality copies based on the automatic calibration of the instrument.

Referring now to the accompanying flow chart of FIG. 6, which is representative of a computer listing in the microfiche appendix referred to above, it can be understood how the pulses obtained from the sensors 40, 41 during calibration are accumulated, stored and used for processing of information through the microcomputer 100, how the other various functions of the invention are performed, and how the self calibrating feature of the invention is utilized to perform the functions of the invention.

To calibrate the device the operator need only depress the calibrate button 185, shown in FIG. 2a, which is located on the back panel of the housing illustrated in FIG. 1. Depression of the calibrate function is detected from the switch scan 400 performed by the input I/O port 140. The programmed microprocessor 110 then sets a calibrate counter to ten seconds 410, sets the display 198 to ten 420 and clears an increment counter 430 which will be used to store the calibrate count, the pulses emitted from the sensor circuits 40 or 41.

The programming then functions to turn on the camera lights 440, to turn on the expose indicator 450 and to set a shutter delay for three seconds 460. The three second delay between activation of the lights and the opening of the shutter permits the lighting to stabilize at full value when exposure begins. This feature can be inactivated for cameras using no shutter with a switch 308 shown on the schematic of FIG. 2. The program then determines if the shutter delay is on 470. If the delay is activated the program returns from the calibrate subroutine 480 to await an interrupt. When an interrupt 490 occurs, for example the 4.1 millisecond timing interrupt 500, the microprocessor 110 will run through the interrupt program 490 to determine the nature of the interrupt and take other actions necessary for efficient operation of the instrument. Upon a timer interrupt 500 the display 198 will be refreshed 510 using the multiplexing circuitry 192 discussed above.

The densitometer counter will be checked 520. If there is no densitometer input, the shutter delay will be checked 530. If the shutter delay is on, as it will be during the initial period of calibration, the shutter delay will be checked to see if it is equal to zero 540. If not, the delay will be decremented by one timing cycle 550. If the delay is not yet equal to zero 560 the program will return from the interrupt 570 to await another interrupt. After the three second delay, when the delay is equal to zero 560, the program will return to the calibrate subroutine 400. If the shutter delay has expired 470 the shutter delay will no longer be on. The programming means will then turn off the keyboard 580, turn on the shutter 590 and turn on the main sensor 40, 600 to begin pulsing, each pulse causing an interrupt to the microprocessor 100, and then return from the subroutine to the interrupt program 480.

Upon obtaining a first pulse from the sensor 40 the interrupt routine 490 will again be processed. It will not be a timer interrupt 500 therefore the program will determine whether or not it is a densitometer read 610. If not, it will look at the densitometer count 620. Since no count will exist it will determine if a sensor interrupt 630 has taken place. Since a sensor interrupt has taken place it will then determine whether or not the instrument is calibrating 640. Since the instrument is calibrating it will increment the increment counter by one 650 and return to the interrupt routine 660. In this manner pulses will be stored which correspond directly to the amount of time and the intensity of the light in the increment counter 650.

Upon the occurrence of the next timer interrupt 500 the program will refresh the display 510, check the density counter 520, determine if the shutter delay is on 530, and check the calibrate count 670. Since it will not be equal to zero it will decrement the time count by one 680. Since the count is not yet zero 690 it will return 700 for the next timer interrupt 500 or pulse interrupt 630 to increment the increment count 650 or decrement the timing counter 680.

When the timing counter has been decremented from ten seconds to zero the latter programming path will reach a count equal to zero 690. At that time the program will determine whether or not a main exposure is being calibrated 710. Since it is, it will store the increment counter in the main calibrate data address location 720. It will then clear the increment counter 730, set the calibrate counter to ten seconds 740 and then jump to start the flash 750. Since the microprocessor clock 180 is operating at one megahertz, these operations take place substantially faster than the interrupts, faster than either the pulse interrupts 630 from the sensor circuits 40, 41 or the timing interrupts 500, every 4.1 milliseconds, will occur.

Calibration using the start flash subroutine 760 is similar to the calibration of the main lamps. The start flash calibrate subroutine 760 begins by turning on the flash lamp 770, turning on the flash sensor 780, turning on the expose 790, and returning from the subroutine 800 to the interrupt subroutine 490 to await an interrupt. A pulse input will follow the same interrupt path 500, 610, 620, 630, 640 as the pulse input from a main calibrate. The increment counter will be incremented by one 650 and the program will return for another interrupt 660. A timer interrupt will follow also the same timer interrupt path 500, 510, 520, 530, 670. The ten second timing counter 680 will be decremented until the count equals zero 690. When the count equals zero 690 the program will determine that a main exposure is not taking place 710 and will store the calibration count in the flash calibration data location 810 and return from the interrupt routine 820 to complete another subroutine or await another interrupt to the microprocessor.

The microprocessor has, at this point, a pulse count which corresponds to both time and illumination of the main lamps and the flash lamp which can then be used as a standard for all other exposures and the instrument operates from the calibration time forward using the ten second calibration as the standard. If the lights get brighter or dimmer they will cause more pulses to be admitted or less pulses, respectively, in the same amount of time. Therefore, if the operator keys in ten seconds, the operator data entry will be converted to the number of counts necessary in order to obtain a time light exposure based on the number of counts that were obtained during calibration. If the lights get dimmer the number of pulses or counts will be slower than during calibration and therefore the lights will be energized for a time period necessary to obtain those counts, a time period longer than ten seconds. Therefore, the resulting exposure will take into account both the time of energization and the illumination from the lights, to give a perfectly repeatable exposure.

With this capability established, the many other factors that can be involved in exposing film can be easily accommodated by the processing capabilities of the microprocessor. For example, reciprocity error, the difference in reaction of film between a brighter light for a shorter period of time and a dimmer light for a longer period of time can be easily accommodated by comparing the pulse count with the calibrated pulse count and with algorithm in the microprocessor 110 software modifying the exposure by the known reciprocity error compensation relationship.

After the unit has been automatically calibrated the operator may perform a test shot to determine the effect of the film type or speed, chemistry and halftone screen being used on exposures. Highlight and shadow density dot sizes can then be keyed into the instrument with the keyboard 22 or the densitometer probe 50 can be used to feed this information directly into the instrument. Calibration and operation of the densitometer 50 is performed, for a preselected period of time, preferably three tenths of a second, using the interrupt routines 490, densitometer interrupt routines 610, 620, 830, 840, 520, 850, 860, 870 and a densitometer subroutine (not shown) in the same manner as the calibration and sensing of exposure time and exposure intensity from the lamps.

To use the instrument to make an exposure the exposure times are entered into the input keyboard 22 using the enter key 38 or densities can be entered into the keyboard 22 with the enter key 38 and converted to exposure times by the microprocessor 100. As indicated above, the microprocessor has the capability of storing a number of exposure times or densities for a number of copies, each of which is stored in the microprocessor data memories 130, 131.

To initiate an exposure the operator then presses the start function key 37. As discussed in connection with FIG. 2, the start key 37 will cause an interrupt 490. Referring to FIG. 6 it will not be a timer interrupt 500. It will not be a densitometer read interrupt 610, it will not be a densitometer count interrupt 620, it will not be a sensor interrupt 630. It will be a start interrupt 880. Therefore, the interrupt routine will inquire as to whether it is a start or stop 890. Being a start 900 it will jump to the start subroutine 910. The start subroutine 920 will begin by jumping to the ratio subroutine 930. The ratio subroutine 940 will inquire as to whether it is a flash 950. Not being a flash it will recall the main calibrate count 960, will multiply the main calibrate count by the calculated or entered exposure 970, divide that number by ten 980 since a ten second calibration was performed, and store that count in the decrement counter 990 and return from the ratio subroutine 1000 to start subroutine 920.

Since initially a flash exposure will not be taking place 1010, the camera lights will be turned on 440, the expose indicator will be turned on 450, the shutter delay will be set for three seconds 460 to allow the lighting to reach full value, and, the shutter delay being on 470, the microprocessor will return from the main lights subroutine to the interrupt routine 480 to await timer pulses. Upon receipt of the timer pulses, the interrupt routine 490 will follow the same program path 500, 510, 520, 530, 540, 550 as during the calibrate routine until the shutter delay equals zero 560. When the shutter delay equals zero 560 the interrupt routine will branch into the main lighting routine, the shutter delay will be off 470 and the microcomputer 100 will turn off the keyboard 580, turn on the shutter 590, turn on the sensor 600 and return from the subroutine 480 to await another interrupt.

Since the sensor 40 is now on it will be emitting pulses to the microprocessor 110 as interrupts. Upon a pulse receipt 490 the timer will be checked 500. It will not be a timer interrupt. The densitometer will be checked 610, 620. It will not be a densitometer interrupt. The sensor will be checked 630. Since it is a sensor interrupt the calibrate will be checked 640. Since it is not a calibrate the exposure time count in the decrement counter will be decremented by one 1020. Since it is not yet equal to zero 1030 it will return to the interrupt routine 1040 to await another timing pulse or sensor interrupt. This will continue until the decrement count equals zero 1050. When the decrement count equals zero 1050 the programming will jump to the stop routine 1060. As shown in FIG. 6 the stop routine 1070 will turn off the lights 1080, turn off the indicators 1090, turn off the sensors 110, clear the delay 1110 and return from the subroutine to the interrupt routing 1120.

When the operator is ready to initiate a flash exposure he again depresses the start button 37, the start subroutine 920 jumps to the ratio subroutine 930. The ratio subroutine 940 determines it is a flash 950, recalls the flash calibrate count 1130, multiplies the count by the entered or calculated exposure 970, divides by ten 980, stores that count in the decrement counter 990 and returns from the subroutine 1000 to the flash inquiry. Since it is a flash 110 it turns on the flash 770, turns on the the sensor 780, turns on expose 790 and returns from the subroutine to await an interrupt 800. The interrupts initiate the same procedures as discussed in connection with the main exposure decrementing the decrement counter 1020 every time a sensor pulse is received until the decrement counter equals zero 1030. When the decrement counter equals zero 1030 a jump to the stop routine 1060 takes place which turns off the lights, the indicators, the sensor and clears any delays 1070, 1080, 1090, 1100, 1110, 1120.

The bump exposure uses the main lamps without a screen and is initiated and performed in the same manner as the main exposure. In the event the operator wishes to cancel an exposure at any time he depresses the start button 37. This will be detected at the start/stop inquiry 880. When this occurs the interrupt routine will determine that it was not the start 900 and therefore jump to the stop routine 1060 and cancel the exposure.

Other computational processing that can be performed with the microprocessor include midtone control, flat copy correction, automatic computation of the basic density range of the screen being used, compensation for flash effect on the highlight.

Midtone control utilizes the desired highlight and shadow dot size and establishes a midtone dot with a percent of bump exposure which is calculated and displayed with the display LEDs 250 during copy input. For high key copy the bump percent can be increased greater than normal. For low key copy the bump percent can be reduced. For whatever percent of bump exposure is selected, the correct main and flash exposures are automatically computed. Flat copy corrections are necessary where copy density ranges are less than the screen range. Whenever short range copy is entered into the instrument the microprocessor automatically computes and displays the minimum amount of bump exposure required to fit the copy to highlight and shadow dot requirements. This computed amount can be altered if desired by the operator.

Automatic computation of the basic density range of the screen is easily computed in the basic program by making the calculation based on the highlight and shadow densities obtained with the test exposure discussed above.

Flash exposure is commonly used to adjust the range of the halftone so that it fits the range of the copy. In a well balanced copy; good highlights and good shadow densities, the flash exposure has no more than slight effect on the highlight dot. However, the flash exposure is increased significantly with long range copy or short range screens. In these situations, the size of the highlight dot is significantly altered by the flash exposure. This problem can be easily resolved with precise calculation of main and bump exposures which compensate precisely for flash effect therefore yielding copy where the highlight dots are always correct regardless of the amount of flash used.

Flare compensation is also handled and corrected. Camera flare is destructive to any exposure at the film plane and conditions vary from camera to camera. These are handled with the invention by the initial programming of exposures and calibration. Once entered, all density values are automatically corrected for the effect of flare.

While one illumination level for the lamps has been used for purposes of illustration it is also possible to vary the illumination level of the lamps with a stepping switch. The lamps can then be calibrated using the same routines for each illumination level.

From the foregoing description in conjunction with the drawings it can be easily understood that the invention is an extremely flexible device which can be utilized for a wide range of copying requirements using both continuous tone and halftone processes. While the preferred embodiment has been discussed in connection with halftone exposures, this has been for exemplary purposes only, and it is to be understood that the invention can be utilized in exposing line copy, continuous tone and halftone exposures and in exposing masking films and color separation films.

In general, while I have described a specific embodiment of my invention, it is to be understood that this is for purposes of illustration only and that various modifications can be made within the scope of my invention. For example, the indicating means discussed, while shown to be LEDs which light up a display panel, can easily be replaced or supplemented with an audible signal or separate audible tones using the circuitry shown. The microprocessor with additional memory can also be used for the counting and other functions described in connection with discrete chips. Other such modifications will be obvious to those skilled in the art having reviewed the drawings and the enclosed description. All such variations and modifications are intended to be within the scope and intendment of the appended claims.

I claim as my invention:

1. An automated self calibrating exposure computer for controlling the energization of lamps used for exposing film during graphic arts processing comprising:
   means for sensing light from the lamps indicating when the lamps are energized;
   means connected to the sensing means for producing a serial pulse train which relates in number of pulses to the intensity of illumination of the lamps and the time duration of the illumination for purposes of calibration and control;
   processing and control means connected to the pulse producing means and the lamps for receiving input data, processing the input data and for supplying control signals to the lamps, said processing and control means comprising:
   means for causing the lamps to be energized for a preselected calibration time;
   means for counting the number of pulses emitted during the preselected calibration time;
   means for storing the pulse count received during the preselected calibration time;
   data entry means for entering input data calling for exposure times of the same duration of a longer or shorter duration than the preselected calibration time; and
   means for causing the lamps to be energized for the periods of time necessary to obtain the required exposure based on the entered data and the initial calibration.

2. The automated self calibrating exposure computer of claim 1 wherein the processing and control means comprises a programmable digital processing means for storing input data and control information, the control information including a stored program for directing control functions to be performed and for supplying control signals to the lamps as a function of the control information.

3. The automated self calibrating exposure computer of claim 2 wherein the processing and control means further comprises memory means for storing the control information and for storing data and other processing information.

4. The automated self calibrating exposure computer of claim 3 further comprising:
   means for generating regulated power to be supplied to the memory means;
   an alternate energy source;
   an unregulated power supply connected to the regulated power supplying means; and
   a protection circuit connected between the unregulated power supply and the memory means for supplying power to the memories from the alternate energy source if the voltage from the unregulated power supply is below a predetermined value so that data and other processing information is not lost from the memory means.

5. The automated self calibrating exposure computer of claim 4 wherein the protection circuit comprises a time delay means which delays the supply of regulated power to the memory means after the voltage from the unregulated power supply exceeds the predetermined value until the processing and control means has stabilized.

6. The automated self calibrating exposure computer of claim 3 wherein the memory means comprises:
   means for storing data for a plurality of exposures to be made and wherein the process and control means further comprise;
   means for correlating halftone data with the correct copy for multiple programming of halftone exposures.

7. The automated self calibrating exposure computer of claim 2 wherein the system is to be used for halftone processing, utilizing both main and flash lamps, and wherein the exposure computer comprises:
   a plurality of sensing means, one sensing means associated with each type of lamp used during processing;
   and wherein the processing and control means comprises:
   means for energizing each type of lamp for a preselected calibration time;
   means for counting the number of pulses emitted from each sensor during the preselected calibration time of each type of lamp;
   means for storing the pulse count received from each sensor during the preselected calibration time; and
   means for causing each type of lamp to be energized for the period of time necessary to obtain the required exposure based on the entered data for each type of lamp and the initial calibration for each type of lamp.

8. The automated self calibrating exposure computer of claim 7 further comprising:

means for supplying power to the plurality of sensing means;

means for switching the power supply to the sensing means associated with the type of lamp to be energized; and wherein the processing and control means comprises:
means for causing each type of the plurality of lamps to be energized for the required duration and power to be supplied to the associated sensing means according to control information which energizes each type of lamp.

9. The automated self calibrating exposure computer of claim 7 wherein the processing and control means comprises:
means for calculating the flash exposure;
means for calculating the main exposure;
means for calculating the bump exposure; and
wherein the main exposure and the bump exposure are compensated for flare effect caused by the flash exposure.

10. The automated self calibrating exposure computer of claim 7 wherein the processing and control means comprise means for causing the lamps to produce a bump exposure to control location of the midtone dot.

11. The automated self calibrating exposure computer of claim 10 wherein the processing and control means comprises means for calculating the copy density range and means for calculating the screen range and means for causing a bump exposure with the main lamps for flat copy correction.

12. The automated self calibrating exposure computer of claim 10 for use with a camera lens having an electronically controlled bump filter and wherein the processing and control means comprises means for supplying power to cause the bump filter to be positioned over the lens when a bump exposure is being performed.

13. The automated self calibrating exposure computer of claim 7 wherein the processing and control means comprises:
means for calibrating the main exposure time;
means for calibrating the flash exposure time;
and wherein the means for energizing the lamp for the required exposure time comprises:
means for calculating the duration of main exposure based on the calibration of the main exposure; and
means for calculating the duration of flash exposure based on the calibration of the flash exposure.

14. The automated self calibrating exposure computer of claim 13 wherein the processing and control means further comprises:
means for comparing data entered for the main exposure and the flash exposure and wherein the calculation of the main exposure is compensated for flash effect.

15. The automated self calibrating exposure computer of claim 1 wherein the means for sensing when the lamps are energized comprises a photodiode and wherein the means connected to the sensing means for producing a pulse train for purposes of calibration and control comprise:
a first operational amplifier connected across the photodiode;
a charging capacitor connected to the output of the operational amplifier to store a voltage corresponding to the current through the photodiode;
means for discharging the capacitor connected across the charging capacitor;

a second operational amplifier connected to the output of the first operational amplifier and the capacitor to monitor the voltage of the capacitor;
a voltage divider connected to the second input of the second operational amplifier to establish a reference voltage; and
wherein the second operational amplifier causes the means for discharging the capacitor to discharge the capacitor when the voltage across the capacitor reaches the reference voltage thereby causing a pulse train to be developed based on the current through the photodiode.

16. The automated self calibrating exposure computer of claim 4 wherein the pulse train developed by the charging and discharging of the capacitor is a sawtooth wave form and wherein the exposure computer further comprises a pulse sharper circuit to convert the sawtooth wave form into a digital pulse train.

17. The automated self calibrating exposure computer of claim 16 further comprising at least one flip-flop and wherein the output of the pulse shaper is connected to the flip-flop to provide a square wave output connected to the processing and control means as an interrupt.

18. The automated self calibrating exposure computer of claim 1 wherein the means for producing a pulse train produces approximately two thousand pulses per second.

19. The automated self calibrating exposure computer of claim 1 wherein the means for causing the lamps to be energized for a preselected calibration time energizes the lamps for ten seconds.

20. The automated self calibrating exposure computer of claim 1 further comprising indicating means connected to the processing and control means for indicating the process to be performed or being performed.

21. The automated self calibrating exposure computer of claim 20 wherein the indicating means comprises visual display means for indicating the process to be performed or being performed and wherein the processing and control means comprises means for controlling the display means to display information concerning the process being performed.

22. The automated self calibrating exposure computer of claim 1 wherein the data entry means comprise function keys which are connected to the processing and control means to cause control functions to be performed.

23. The automated self calibrating exposure computer of claim 22 wherein one of the function keys comprises a focus key connected to the processing and control means and wherein the processing and control means have means to detect the depression of the focus key and supply control information to cause the lamps to be continuously energized for purposes of focus.

24. The automated selfcalibrating exposure computer of claim 1 wherein the processing and control means further comprises means for permitting the selection of any given exposure from any one of the plurality of lamps.

25. The automated self calibrating exposure computer of claim 1 wherein the processing and control means further comprises override control means for modifying exposure times to compensate for changes in film processor chemistry or changes in the emulsion speed of films.

26. The automated self calibrating exposure computer of claim 1 for use with a camera of the type having an electronically controled shutter wherein the exposure computer comprises:

means for supplying electrical power to the electronically controlled shutter for opening the shutter; and wherein said processing and control means comprise:

means for delaying the supply of electrical power to open the shutter until the lamps reach full illumination;

means for supplying power to cause the shutter to open after the lamps reatch full illumination; and means for counting the number of pulses emitted during the preselected calibration time measured from the time the shutter opens until the end of the preselected calibration time.

27. The automated self calibrating exposure computer of claim 1 for use with lamps which may be selectively energized at any one of a plurality of illumination levels by supplying different levels of electrical power to the lamps:

wherein the processing and control means comprise means for counting the number of pulses emitted at each illumination level; and wherein the means for causing the lamps to be energized for the necessary exposure time causes the lamps to be energized for a time period based on the entered data and the initial calibration at the selected illumination level.

28. The automated self calibrating exposure computer of claim 1 further comprising densitometer meahs for measuring the density of copy to be reproduced connected to the processing and control means.

29. The automated self calibrating exposure computer of claim 28 wherein the densitometer means comprises means for producing a serial pulse train which relates directly to the density of the copy being measured by the densitometer.

30. The automated self calibrating exposure computer of claim 29 wherein the processing and control means further comprises means for counting pulses from the densitometer for a preselected period of time and converting the count to the density of the copy being measured by the densitometer.

31. The automated self calibrating exposure computer of claim 29 wherein the process and control means comprises:

means for storing initial calibration data for the densitometer means;

means for comparing subsequent calibration data with the initial calibration data; and means for correcting any noncalibration reading read by the densitometer by the difference in the initial calibration data and the latest subsequent calibration data.

32. The automated self calibrating exposure computer of claim 1 further comprising means for entering control commands to cause the process and control means to energize the lights for a period of time determined by data entered into the data entry means.

33. The automated self calibrating exposure computer of claim 32 wherein the means for entering control commands is located remotely from but connected to the process and control means.

34. The automated self calibrating exposure computer of claim 1 wherein the processing and control means comprise:

means for calculating the exposure duration for the lamps based on the calibration counts;

means for comparing the exposure duration with the values used for calibration; and means for compensating the exposure time for reciprocity error.

35. The automated self calibrating exposure computer of claim 34 wherein the exposure duration is compensated for reciprocity error due to the time of illumination of the lamps.

36. The automated self calibrating exposure computer of claim 34 wherein the exposure duration is compensated for reciprocity error due to the intensity of illumination of the lamps.

37. The automated self calibrating exposure computer of claim 1 wherein the means for causing the lamps to be energized for the required exposure comprises:

means for calculating the required time of exposure;

means for converting the required time of exposure to a number of pulses that must be received from the sensing means to produce the required exposure;

means for energizing the lamps; and means for deenergizing the lamps when the required number of pulses have been received from the sensors so that the exposure is compensated for both time of illumination of the lamps and intensity of illumination of the lamps.

38. The automated self calibrating exposure computer of claim 37 for use with a camera having a shutter wherein the exposure computer further comprises means for delaying opening of the shutter so that the lamps can reach full illumination and wherein the processing and control means do not begin counting pulses to deenergize the lamps until after a period of time determined by the shutter delay means.

* * * * *

UNITED STATES PATENT AND TRADEMARK OFFICE
CERTIFICATE OF CORRECTION

PATENT NO. : 4,498,140

DATED : February 5, 1985

INVENTOR(S) : Frank A. Hull

It is certified that error appears in the above-identified patent and that said Letters Patent is hereby corrected as shown below:

In column 16, claim 16, line 17, delete the word "sharper" and insert --shaper--

In column 17, claim 26, line 11, delete the word "reatch" and insert --reach--

In column 17, claim 28, line 31, delete the word "meahs" and insert --means--

Signed and Sealed this

Twenty-second Day of October 1985

[SEAL]

Attest:

Attesting Officer

DONALD J. QUIGG

Commissioner of Patents and
Trademarks—Designate

UNITED STATES PATENT AND TRADEMARK OFFICE
CERTIFICATE OF CORRECTION

PATENT NO. : 4,498,140

DATED : February 5, 1985

INVENTOR(S) : Frank A. Hull

It is certified that error appears in the above-identified patent and that said Letters Patent is hereby corrected as shown below:

```
In column 1, line 65, delete the word "camers"
and insert --cameras--

In column 3, line 55, delete the word "the"

In column 12, line 12, delete the words "the the"
and insert --the--

In column 17, line 1, delete the word "controled"
and insert --controlled--
```

Signed and Sealed this

Seventh Day of January 1986

[SEAL]

Attest:

DONALD J. QUIGG

Attesting Officer

Commissioner of Patents and Trademarks